(12) United States Patent
Umetsu (10) Patent No.: US 6,690,032 B1
(45) Date of Patent: Feb. 10, 2004

(54) ELECTRO-OPTICAL DEVICE AND METHOD OF MANUFACTURE THEREOF, AND ELECTRONIC INSTRUMENT

(75) Inventor: Kazushige Umetsu, Chino (JP)

(73) Assignee: Seiko Epson Corporation, Tokyo (JP)

( * ) Notice: Subject to any disclaimer, the term of this patent is extended or adjusted under 35 U.S.C. 154(b) by 16 days.

(21) Appl. No.: 09/787,744

(22) PCT Filed: Jul. 21, 2000

(86) PCT No.: PCT/JP00/04887

§ 371 (c)(1),
(2), (4) Date: Mar. 22, 2001

(87) PCT Pub. No.: WO01/08128

PCT Pub. Date: Feb. 1, 2001

(30) Foreign Application Priority Data

Jul. 22, 1999 (JP) .......................................... 11-207907

(51) Int. Cl.[7] .............................................. H01L 29/15
(52) U.S. Cl. ...................... 257/72; 257/621; 257/684; 349/128
(58) Field of Search .................... 257/72, 621, 684; 349/128

(56) References Cited

U.S. PATENT DOCUMENTS

| 5,528,403 | A | * | 6/1996 | Kawaguchi et al. ........... 359/88 |
| 5,620,755 | A | * | 4/1997 | Smith, Jr. et al. ............... 428/1 |
| 5,847,797 | A | * | 12/1998 | Van Dijk ........................ 344/158 |
| 5,903,239 | A | * | 5/1999 | Takahashi et al. ........... 343/700 |
| 6,181,405 | B1 | * | 1/2001 | Izumi ........................... 349/153 |
| 6,268,898 | B1 | * | 7/2001 | Ihara ............................ 349/155 |
| 6,404,476 | B1 | * | 6/2002 | Mase ........................... 349/149 |
| 6,476,547 | B1 | * | 11/2002 | Kawase ....................... 313/495 |

FOREIGN PATENT DOCUMENTS

| EP | 498 498 | * | 1/1992 |
| GB | 2 037 449 | * | 11/1979 |
| JP | 56-54092 A | | 5/1981 |
| JP | 62-3889 A | | 1/1987 |
| JP | 63-62823 U | | 4/1988 |
| JP | 2-921 A | | 1/1990 |
| JP | 02-000921 | | 1/1990 |
| JP | 2-182390 A | | 7/1990 |
| JP | 2-223925 | * | 9/1990 |
| JP | 02-266592 | | 10/1990 |
| JP | 2-266592 A | | 10/1990 |
| JP | 3-46393 A | | 2/1991 |
| JP | 3-26121 U | | 3/1991 |
| JP | 3-35528 U | | 4/1991 |
| JP | 3-276186 A | | 12/1991 |
| JP | 3-276186 | * | 12/1991 |
| JP | 3 276186 | * | 12/1991 |
| JP | 04-147219 | | 5/1992 |
| JP | 4-147219 A | | 5/1992 |
| JP | 04-153626 | | 5/1992 |
| JP | 4-153626 A | | 5/1992 |
| JP | 6-34985 | * | 2/1994 |
| JP | 8-62616 A | | 3/1996 |
| JP | 9-101533 | * | 4/1997 |
| JP | 11-174485 | * | 7/1997 |
| JP | 10-104651 | * | 4/1998 |
| JP | 10-293319 | * | 11/1998 |
| JP | 10 293319 | * | 11/1998 |
| JP | 11-174485 | * | 7/1999 |
| JP | 11 174485 | * | 7/1999 |
| JP | 11-174485 A | | 7/1999 |
| JP | 10-293319 | * | 11/1999 |

* cited by examiner

*Primary Examiner*—Nathan J. Flynn
*Assistant Examiner*—Ahmed J. Sefer
(74) *Attorney, Agent, or Firm*—Oliff & Berridge, PLC (57) ABSTRACT

An electro-optical device comprises first and second substrates (10, 20) disposed facing each other, an interconnect (14) formed on the surface of the first substrate (10) opposing the second substrate (20), and a conductive member (40) passing through the second substrate (20) and reaching both surfaces of the second substrate (20), and the conductive member (40) and interconnect (14) are electrically connected between the first and second substrates (10, 20).

12 Claims, 10 Drawing Sheets

ELECTRO-OPTICAL DEVICE AND METHOD OF MANUFACTURE THEREOF, AND ELECTRONIC INSTRUMENT

TECHNICAL FIELD

The present invention relates to an electro-optical device and method of manufacture thereof, and to an electronic instrument.

BACKGROUND OF ART

A liquid crystal panel has two transparent substrates, with a liquid crystal sealed between them. In a conventional liquid crystal panel, one transparent substrate has a projection which projects laterally beyond the other transparent substrate. Transparent electrodes are connected to interconnects extending over this projection to be gathered toward the end. The ends of the interconnects form external terminals aligned in a straight line. On the projection is fixed the end of a flexible interconnect substrate. At the end of the flexible interconnect substrate, interconnect pattern connection terminals are exposed, and the connection terminals are electrically connected to the external terminals formed on the projection of the transparent substrate.

The flexible interconnect substrate is bent from the end connected to the projection to the rear of the liquid crystal panel, and is disposed on the rear of the liquid crystal panel. Therefore, the bent portion of the flexible interconnect substrate projects on the outside of the projection, and therefore a display device equipped with the liquid crystal panel is made more bulky. With the increasing miniaturization of electronic instruments in recent years (in particular the miniaturization of portable devices such as portable telephones), the demand for miniaturization of electro-optical devices has grown stronger and stronger.

The present invention solves the above problem, and has as its object the provision of an electro-optical device capable of miniaturization and method of manufacture thereof, and of an electronic instrument.

DISCLOSURE OF INVENTION (1) The electro-optical device of the present invention comprises:

first and second substrates disposed to oppose each other;

an interconnect formed on (above) a surface of the first substrate opposing the second substrate; and a conductive member provided to pass through the second substrate, wherein the conductive member and the interconnect are electrically connected between the first and second substrates.

According to the present invention, the conductive member to which the interconnect is electrically connected extends as far as both surfaces of the second substrate. As a result, for the interconnect positioned between the opposing first and second substrates, an electrical connection through the conductive member from the surface of the second substrate opposite to the first substrate can be obtained. Moreover, since the conductive member and interconnect are electrically connected between the first and second substrates, the electro-optical device can be miniaturized.

(2) This electro-optical device may further comprise a conductor disposed on (above) an opposite side of the second substrate from the first substrate, and the conductor may electrically connected to the conductive member.

By means of this, through the conductor and conductive member, an electrical connection to the interconnect can be achieved.

(3) This electro-optical device may further comprise an integrated circuit chip disposed on (above) the an integrated circuit chip disposed on an opposite side of the second substrate from the first substrate, and the conductor may be electrically connected to the integrated circuit chip.

By means of this, through the conductor and conductive member, an electrical connection between the integrated circuit chip and the interconnect can be achieved.

(4) In this electro-optical device:

a plurality of the interconnects may be formed, and a plurality of the conductive members electrically connected to the plurality of interconnects may be provided.

(5) In this electro-optical device:

the plurality of conductive members may be arranged in a zigzag.

By means of this, even if the pitch of the plurality of interconnects is small, the pitch of the plurality of conductive members can be made larger.

(6) In this electro-optical device:

the conductive member may be formed on (above) a part of the second substrate which overlaps with the first substrate.

By means of this, since the conductive member can be provided within the area of the outer form of the first or second substrate, the electro-optical device can be further miniaturized.

(7) In this electro-optical device:

a part of the second substrate may project beyond the region corresponding to the first substrate, and the conductive member may be formed on (above) the projected part of the second substrate.

The present invention is not such as to prevent such an embodiment.

(8) In this electro-optical device:

an integrated circuit chip may be mounted on the projected part of the second substrate.

In this way, the projecting part of the second substrate may be used.

(9) In this electro-optical device:

the first and second substrates may be adhered together by a sealant, and the conductive member may be formed closer to end of the second substrate than the sealant.

In this configuration, the conductive member can be observed from outside of the sealant.

(10) In this electro-optical device:

the first and second substrates may be adhered together by a sealant; and the conductive member may be formed toward the center portion of the second substrate from the sealant.

By means of this, the conductive member is protected by the sealant.

(11) In this electro-optical device:

the first and second substrates may be adhered together by a sealant, and the conductive member may be formed on (above) a portion of the second substrate which overlaps with the sealant.

By means of this, since the area in which the sealant is provided and the area in which the conductive member is provided overlap each other, the electro-optical device can be further miniaturized.

(12) In this electro-optical device:
the sealant may be an anisotropic conductive adhesive material.

(13) The electronic instrument of the present invention comprises the above described electro-optical device.

According to the present invention, since the electro-optical device can be miniaturized, the electronic instrument can also be miniaturized.

(14) The method of manufacture of an electro-optical device of the present invention comprises disposing a first substrate on (above) which an interconnect is formed and a second substrate through which a conductive member is provided so as to oppose each other with the interconnect on (above) inside between the first and second substrates, and electrically connecting the conductive member and the interconnect between the first and second substrates.

According to the present invention, for the interconnect positioned between the opposing first and second substrates, an electrical connection through the conductive member from the surface of the second substrate opposite to the first substrate can be obtained. Moreover, since the conductive member and interconnect are electrically connected between the first and second substrates, a compact electro-optical device can be obtained.

(15) In this method of manufacture of an electro-optical device:
through hole may be formed in the second substrate, and the conductive member may be provided in the through hole.

By means of this, since the conductive member is provided within the outer form of the second substrate, the conductive member can be disposed not to protrude outside the second substrate.

(16) In this method of manufacture of an electro-optical device:
a hole smaller than the through hole may be first formed, then the hole is enlarged to form the through hole.

By means of this, the hole can be formed with less energy than the formation of the through hole, and having formed the hole in advance, the through hole can be formed with less energy.

(17) In this method of manufacture of an electro-optical device:
a depression may be formed in a position for forming the through hole, and the depression is used for positioning in forming the hole.

By means of this, the position of forming the through hole can be assured by the depression, and therefore the through hole can be formed with accurate positioning.

(18) In this method of manufacture of an electro-optical device:
the hole may be formed by a laser beam, and enlarged by wet etching.

By means of this, the through hole can be formed easily. Even if the inner surface of the hole formed by the laser beam are rough, through hole with smooth inner walls can be formed since they are enlarged by wet etching.

BEST MODE FOR CARRYING OUT THE INVENTION

Next, embodiments of the electro-optical device according to the present invention are described with reference to the attached drawings. An example of an electro-optical device is an electro-optical panel. An electro-optical panel is equipped with an electro-optical substance sandwiched between panel substrates. The electro-optical panel constitutes the display device of an electronic instrument. Examples of an electro-optical panel include liquid crystal panels, electroluminance panels, and plasma display panels.

First Embodiment

Figure 1:
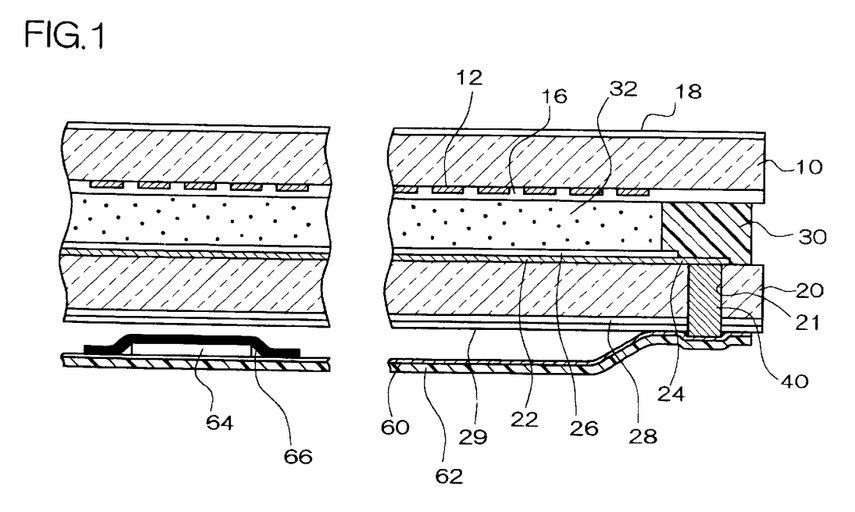
FIG. 1 illustrates a first embodiment of a liquid crystal panel to which the present invention is applied, and is a section along the line I—I in FIG. 3.
Figure 2:
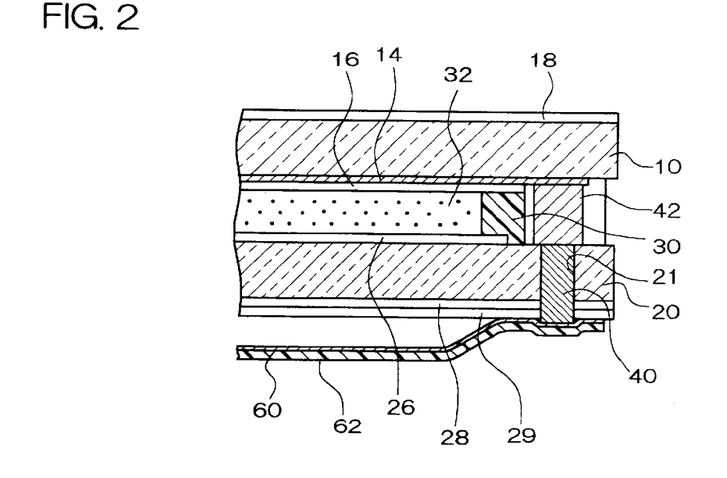
FIG. 2 illustrates the first embodiment of a liquid crystal panel to which the present invention is applied, and is a sectional view along the line II—II in FIG. 3.
Figure 3:
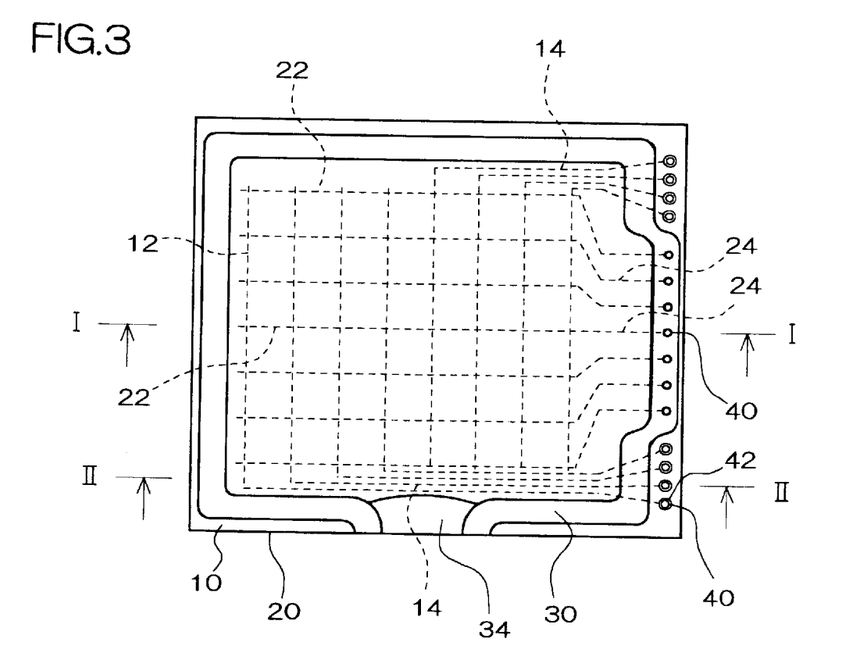
FIG. 3 illustrates the first embodiment of a liquid crystal panel to which the present invention is applied.

FIGS. 1 and 2 are enlarged sectional views showing the construction of the peripheral portion of this embodiment of a liquid crystal panel, and FIG. 3 is a schematic plan view of this embodiment of the liquid crystal panel. FIG. 1 is a section along the line I—I shown in FIG. 3, and FIG. 2 is a section along the line II—II shown in FIG. 3.

This embodiment of a liquid crystal panel comprises oppositely disposed first and second substrates 10 and 20. Of the first and second substrates 10 and 20, at least one (and in this embodiment both) is formed of a transparent substrate such as glass.

On one surface of the first substrate 10 is formed a plurality of electrodes 12 and a plurality of interconnects 14. Between the electrodes 12 and electrodes 22 described below, a voltage is applied to a liquid crystal 32. That is to say, the electrodes 12 include portions which apply a voltage to the liquid crystal 32. When light passes through the first substrate 10, the electrodes 12 are transparent electrodes, formed of for example ITO (Indium Tin Oxide). The plurality of electrodes 12 are formed in stripe form. The interconnects 14 are electrically connected to the electrodes 12. At least over the electrodes 12 (and in this embodiment, over the electrodes 12 and interconnects 14), is formed an orienting film 16. On the other surface of the first substrate 10 is provided a polarizer 18.

On one surface of the second substrate 20 is formed a plurality of electrodes 22 and a plurality of interconnects 24. Between the electrodes 22 and the electrodes 12 mentioned above, a voltage is applied to the liquid crystal 32. That is to say, the electrodes 22 include portions which apply a voltage to the liquid crystal 32. When light passes through the second substrate 20, the electrodes 22 are transparent electrodes, formed of for example ITO (Indium Tin Oxide). The plurality of electrodes 22 are formed in stripe form. The interconnects 24 are electrically connected to the electrodes 22.

In the second substrate 20, as shown in FIGS. 1 and 2, is formed a plurality of through holes (or through pores) 21. The through holes 21 are formed in for example one row on the end of the second substrate 20. The number of the through holes 21 formed may be equal to the total number of the interconnects 14 and 24. Some of the interconnects 14 and 24 are disposed to reach positions overlapping with some of the through holes 21. The parts of the plurality of interconnects 14 and 24 overlapping with the through holes 21, and the plurality of through holes 21 are formed at approximately the same pitch (for example a pitch of approximately 100 $\mu$m). The width of the interconnects 14 and 24 and the size of the through holes 21 (the diameter if the hole is circular) may be approximately equal (for example approximately 30 $\mu$m diameter).

For each of the through holes 21 a conductive member 40 is provided. The conductive member 40 is formed of a conductive material such as a metal or a conductive paste. The conductive member 40 is provided to pass through the second substrate 20, and can enable electrical connection between the two surfaces of the second substrate 20. That is to say, by means of the conductive material 40 provided in the through holes 21, an electrical connection is constituted. The conductive member 40 may be a layer formed on the inner wall of the through holes 21 to form an open "through hole" or as with the through holes 21 shown in FIGS. 1 and 2 may be filled in. If the conductive member 40 is provided in the through holes 21, it is not necessary to cover the side of the conductive member 40 or to protect it.

Even though on the second substrate 20 are provided an orienting film 26, polarizer 28, reflector 29, and so on, electrical connection of two surfaces of the second substrate 20 can be achieved by means of the conductive member 40. For example, as shown in FIGS. 1 and 2, on one surface of the second substrate 20 the orienting film 26 may be provided to avoid the region in which the conductive member 40 is provided. Alternatively, as a variant, holes communicating with the through holes 21 may be formed in the orienting film 26. On the other surface of the second substrate 20, as shown in FIGS. 1 and 2, holes communicating with the through holes 21 may be formed in the polarizer 28 and reflector 29. Alternatively, as a modification, the polarizer 28 and reflector 29 may be provided to avoid the region in which conductive member 40 is provided.

The conductive member 40 may be formed to be flush with surrounding members, or may be formed so as to project beyond the surrounding members, or may be formed so as to be recessed with respect to the surrounding members. For example, in FIGS. 1 and 2, the conductive member 40 is formed flush with the surface of the second substrate 20 on which the interconnects 24 are formed, but it may equally project from this surface, or may be recessed with respect to this surface. The conductive member 40, in FIGS. 1 and 2, is formed to project beyond the reflector 29, but may equally be formed to be flush with the reflector 29, or may be formed to be recessed with respect to the reflector 29.

It should be noted that in order to provide the conductive member 40 is it sufficient that there be a path reaching both surfaces of the second substrate 20 (inner and outer surfaces or front and rear surfaces). For example, in the end of the second substrate 20 a cutout (for example a groove formed in the side surface) may be formed and the conductive member 40 may be provided by this cutout.

On the second substrate 20, each of the interconnects 24 is connected to some conductive member 40. Each of the interconnects 14 formed on the first substrate 10 is connected to some conductive member 40, and this is described below.

On the second substrate 20, at least over the electrodes 22 (and in this embodiment, over the electrodes 22 and interconnects 24), the orienting film 26 is formed. On the other surface of the second substrate 20, the polarizer 28 is provided.

This embodiment of a liquid crystal panel is a reflective type, and on the outside of the polarizer 28 provided on one substrate (for example the second substrate 20), the reflector 29 is provided. As a modification, the electrodes 22 may be formed of a material (for example aluminum) that reflects light, and the reflector 29 may be omitted. In this case, of the electrodes 22, regions between the portions used to apply a voltage to the liquid crystal 32 may be covered with a light-blocking material (a material opaque to light). Alternatively, without providing a light-blocking material, a backlight may be provided on the rear surface of the substrate (a semitransmitting-reflective type of liquid crystal panel). Alternatively, the electrodes 12 and 22 may be formed as transparent electrodes, and a backlight may be provided on the rear surface of the substrate (transmitting type of liquid crystal panel).

The first and second substrates 10 and 20 are opposed so that the electrodes 12 and 22 are in matrix form. The first and second substrates 10 and 20 are disposed spaced apart (for example with a spacer not shown in the drawings interposed). The surface of the first substrate 10 on which the electrodes 12 are formed and the surface of the second substrate 20 on which the electrodes 22 are formed are opposed. That is to say, the electrodes 12 and 22 and interconnects 14 and 24 are disposed on the opposing inner surfaces of the first and second substrates 10 and 20.

In a passive matrix type of liquid crystal panel, either of the electrodes 12 and 22 (for example the electrodes 12) are signal electrodes, and the other (for example the electrodes 22) are scan electrodes. In an active matrix type of liquid crystal panel, either of the electrodes 12 and 22 (for example the electrodes 12) include pixel electrodes, and the other (for example the electrodes 22) are common electrodes. The pixel electrodes are the portions which apply a voltage to the liquid crystal 32.

As shown in FIG. 2, the interconnects 14 and the conductive member 40 are electrically connected to the conductive member 40. To provide this electrical connection, a vertical conductive member 42 is provided between the first and second substrates 10 and 20. For the vertical conductive member 42, a conductive paste (for example conductive particles (for example resin spheres the outer surface of which is covered with a conductor such as Cr, Ni, or the like) introduced into a resin) may be used. As the conductive paste is preferably used an ultraviolet-cured resin or the like which can be optically cured without the application of heat to cure.

According to this embodiment, the interconnects 14 are formed on the surface of the first substrate 10 opposing the second substrate 20, and the conductive member 40 is provided so as to be exposed on both surfaces of the second substrate 20 (for example passing through the second substrate 20). As a result, from the surface of the second substrate 20 opposite to that of the first substrate 10, an electrical connection can be obtained with the interconnects 14 formed on the first substrate 10. Moreover, the vertical conductive member 42 providing the electrical connection between the interconnects 14 and the conductive member 40 is provided between the first and second substrates 10 and 20. Therefore, the electro-optical device (in this embodiment, a liquid crystal panel) can be miniaturized.

According to this embodiment, a plurality of the conductive members (connection portions) 40 are arranged along the outer periphery of the second substrate 20, and therefore not only is the effect on the internal construction of the electro-optical device (liquid crystal panel) reduced, but also the area of the second substrate 20 can be reduced. In particular, by arranging the plurality of conductive members 40 in a single row (or in a straight line form), the region required for the formation of the plurality of conductive members 40 can be reduced.

In this embodiment, the conductive members 40 are formed in a portion of the second substrate 20 overlapping with the first substrate 10. As a result, since the conductive members 40 are provided within the outer form of the first and second substrates 10 and 20, in this respect also, the electro-optical device (in this embodiment, a liquid crystal panel) can be miniaturized.

It should be noted that in FIGS. 2 and 3, the number of the vertical conductive members 42 and through holes 21, and the number and form of the electrodes 12 and 22 and interconnects 14 and 24 are schematic, and show a simplification of an actual liquid crystal panel.

In this embodiment, the first and second substrates 10 and 20 are adhered together by a sealant 30 and seal member 34. The sealant 30 and seal member 34 are of, for example, a resin, and both may be of the same material. The sealant 30 and seal member 34 are provided so as to surround the center portion of the first and second substrates 10 and 20 (for example as a frame). It should be noted that in the assembly of the liquid crystal panel, the substrates 10 and 20 are adhered together with the sealant 30 interposed in a partial incomplete frame form, and then after filling with the liquid crystal 32 through the opening in the sealant 30, this opening is closed with the seal member 34.

Inside the first and second substrates 10 and 20 the liquid crystal 32 being an electro-optical substance is sealed. The liquid crystal 32 is sealed within a region defined by the sealant 30 and seal member 34.

In this embodiment, as shown in FIG. 3, the sealant 30 passes inside the conductive member 40 electrically connected to the interconnects 14, and passes over the conductive member 40 electrically connected to the interconnects 24.

In more detail, the sealant 30 is disposed on the inside of the first and second substrates 10 and 20 from the vertical conductive member 42. In other words, the conductive member 40 connected to the interconnects 14 formed on the first substrate 10 is positioned closer to the end of the second substrate 20 than the sealant 30. Therefore, the interconnects 14 formed on the first substrate 10 pass over the sealant 30, and are brought out outside the sealant 30.

On the other hand, the sealant 30 is provided in a position to overlap with the conductive members 40 connected to the interconnects 24 formed on the second substrate 20. Therefore, the interconnects 24 formed on the second substrate 20 extend below the sealant 30. Since the through holes 21 formed to correspond to the interconnects 24 are formed positioned below the sealant 30, it is possible to eliminate the region outside the sealant 30.

Figure 4:
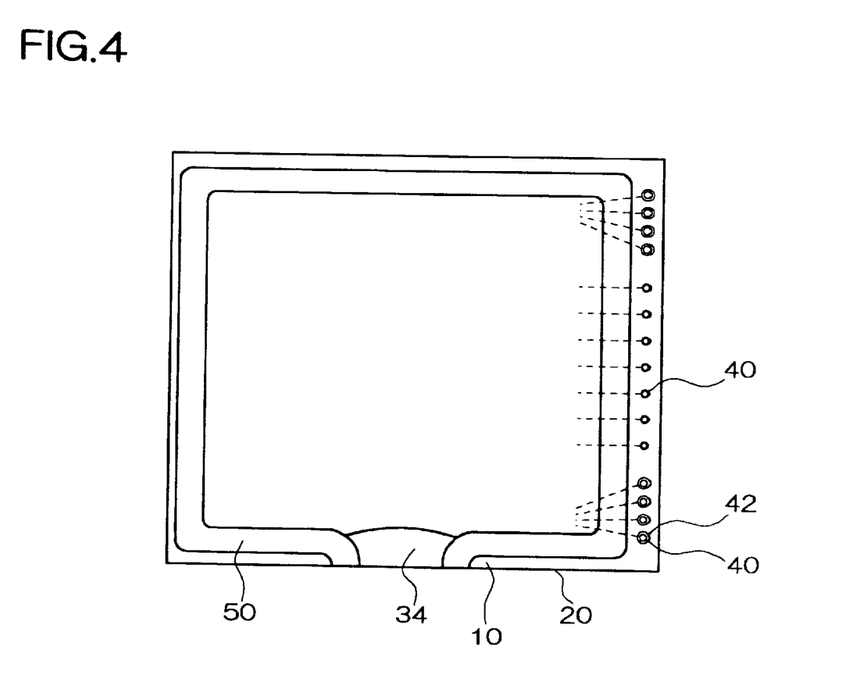
FIG. 4 illustrates a modification of the first embodiment of a liquid crystal panel to which the present invention is applied.

Alternatively, as a modification, as shown in FIG. 4, a sealant 50 and seal member 34 may be formed in a rectangle, and conductive members 40 provided on the outside of the sealant 50.

On the surface of the second substrate 20 opposite to the first substrate 10, a conductor 60 is electrically connected to the conductive member 40. It should be noted that the conductor 60 may be connected to both the conductive members 40 electrically connected to the interconnects 14 formed on the first substrate 10 and the conductive members 40 electrically connected to the interconnects 24 formed on the second substrate 20.

The conductor 60 is an interconnect pattern formed on a substrate (for example, a flexible substrate) 62. The conductor 60 (and the substrate 62) are disposed on the side of the second substrate 20 opposite to the first substrate 10. By means of the conductor 60 and substrate 62 the interconnect substrate (for example a flexible interconnect substrate) is constituted. On the interconnect substrate an integrated circuit chip (for example a semiconductor chip) 60 is mounted, and the integrated circuit chip 64 is electrically connected to the conductor 60. The integrated circuit chip 64 includes a liquid crystal panel drive circuit. The integrated circuit chip 64 is disposed on the side of the second substrate 20 opposite to the first substrate 10. Furthermore, to prevent malfunction caused by light the integrated circuit chip 64 may be covered by a light blocking film 66.

According to this embodiment, the conductor 60 is electrically connected to the interconnects 14 formed on the first substrate 10 with the conductive member 40 and vertical conductive member 42 interposed. Since the conductive member 40 passes through the second substrate 20, the conductor 60 need not be brought out on the side of the second substrate 20. Therefore, the space occupied by the conductor 60 is small, and consequently the device in which the liquid crystal panel is installed can be miniaturized.

This embodiment of a liquid crystal panel is constructed as described above, and the method of manufacture thereof is now described.

A first substrate 10 on which the interconnects 14 are formed, and a second substrate 20 through which the conductive members 40 pass and on which the interconnects 24 are formed are taken. In this embodiment, the conductive member 40 is provided within through holes 40 formed in the second substrate 20. The method of formation of the through holes 21 is now described.

On for example the second substrate 20, a mask is provided in a pattern corresponding to the through holes 21. Then blast processing (sand blasting, scribing) or etching processing (wet etching by hydrofluoric acid or a mixture hydrofluoric acid and sulfuric acid or dry etching by halogen gas or the like) is applied, or ultrasound processing or laser processing is applied whereby the through holes 21 are formed.

Alternatively, holes smaller than the through holes 21 can be previously formed, and holes enlarged to provide the through holes 21. By means of this, the holes can be formed with less energy than the through holes 21, and by preforming the holes, the energy for forming the through holes 21 can be reduced.

To form the holes, a laser (for example a YAG laser or C02 laser) can be used. The laser beam may be directed at one surface of the second substrate 20 to provide the holes, or the laser bean may be directed from both sides of the second substrate 20 (either sequentially or simultaneously). If the laser beam is directed from both sides, the influence on the second substrate 20 is reduced.

It should be noted that a depression may be formed beforehand in the position of forming the through holes 21, and by means of the depression, positioning may be carried out to provide the holes. By means of this, the position of forming the through holes 21 can be made certain by means of the depression, and the through holes 21 can be formed in precise positions. The depression can be formed by etching (wet etching or dry etching).

When enlarging the holes to form the through holes 21, wet etching can be applied. As an etchant is used, for example, an aqueous solution of a mixture of hydrofluoric acid and ammonium fluoride (buffered hydrofluoric acid). By means of this, the through holes 21 can be easily formed. Even if the inner walls of holes formed by a laser beam are rough, since they are enlarged by wet etching, through holes 21 with smooth inner walls can be formed.

To provide the through holes 21 with the conductive member 40, plating may be applied. For example, a metal layer may be formed on the inner walls through of the holes 21 by electroless plating, and an open "through hole" may be provided. Alternatively, the interior of the through holes 21 may be filled with a metal by plating. More concretely, by closing one of the openings on both sides of the through holes 21 with a metal plate, and supplying a plating fluid from the opening on the opposite side, a metal pillar may be provided by electroless plating. Alternatively, the through holes 21 may be filled with a molten metal (molten solder or the like), or a conductive resin (conductive paste). Alternatively, sputtering, vapor deposition, or the like may be used to deposit a conductor within the through holes 21. Alternatively, a reactive gas such as tungsten carbonyl, molybdenum carbonyl, or the like may be supplied, while a laser beam is directed into the through holes 21, to deposit tungsten, molybdenum, or the like on the inner surface of the through holes 21 (laser CVD). Alternatively, an interconnect may be passed through the through holes 21.

When the first and second substrates 10 and 20 are ready, the first and second substrates 10 and 20 are fixed opposing with the interconnects 14 and 24 disposed on the inside. Between the first and second substrates 10 and 20, for example the vertical conductive member 42 is provided. The vertical conductive member 42 is provided to connect the interconnects 14 and the conductive member 40 formed on the second substrate 20. The step of providing the vertical conductive member 42 may be carried out before fixing the first and second substrates 10 and 20, or if possible may be carried out afterwards. In this way, the conductive member 40 and the interconnects 14 can be electrically connected.

Second Embodiment

Figure 5:
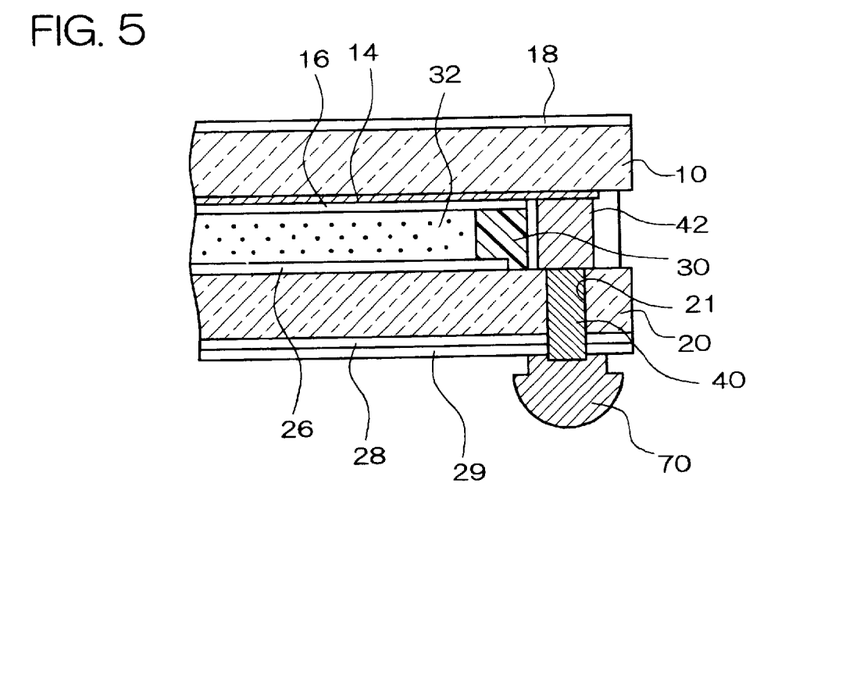
FIG. 5 illustrates a second embodiment of a liquid crystal panel to which the present invention is applied.

FIG. 5 shows a second embodiment to which the present invention is applied. This embodiment of a liquid crystal panel comprises the first and second substrates 10 and 20 described in the first embodiment, and on the second substrate 20 at least one conductor 70 is provided. In FIG. 5 one conductor 70 is shown, but a plurality of conductors 70 may be provided. The conductor 70 is a bump (bump electrode), and can be formed of a brazing material (for example solder) or other metal. As the method of forming the conductor 70, solder balls may be mounted. Alternatively, the conductor 70 may be provided by depositing a metal by plating on, for example, the conductive member 40.

The conductor 70 is provided on the surface of the second substrate 20 opposite to the first substrate 10, and is electrically connected to the conductive member 40. In the example shown in FIG. 5, the conductor 70 is provided on the conductive member 40, but as a modification thereof, an interconnect (conductor) may be brought out from the conductive member 40, and the conductor 70 may be provided in a different position from the conductive member 40. For example, a plurality of conductive members 40 may be disposed to form a plurality of rows and a plurality of columns (two-dimensionally).

In this embodiment, since the conductor 70 is formed on the outer surface of the second substrate 20, the liquid crystal panel can be in direct electrical contact with connection terminals formed on the surface of a circuit board or the like. This construction is appropriate when using a panel support to which the liquid crystal panel is fixed. In this case, the liquid crystal panel is fixed so. that the conductor 70 is pressed against a connection terminal formed as a pad on the surface of the circuit board installed within the electronic instrument.

It should be noted that if the conductor 70 is pressed against another conductor which is not fixed with respect to the liquid crystal panel, then the conductive member 40 may be constructed by means of a conductive resilient member, for example a conductive rubber or the like. By means of the fact that the conductor 70 (terminal portion) is formed at the extremity of the resilient member, the stress applied to the liquid crystal panel can be reduced.

Third Embodiment

Figure 6:
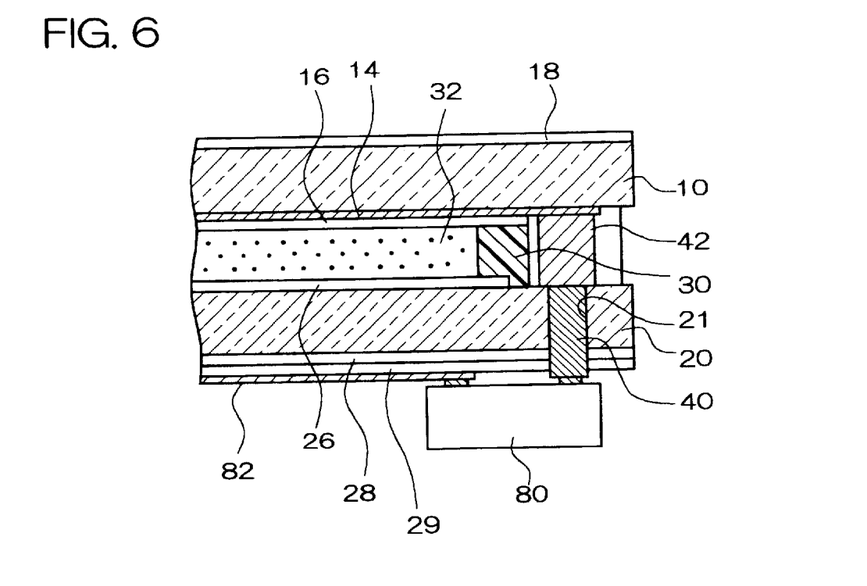
FIG. 6 illustrates a third embodiment of a liquid crystal panel to which the present invention is applied.

FIG. 6 shows a third embodiment to which the present invention is applied. This embodiment of a liquid crystal panel comprises the first and second substrates 10 and 20 described in the first embodiment.

In this embodiment, an integrated circuit chip 80 is mounted on the second substrate 20. The details of the integrated circuit chip 64 described in the first embodiment apply to the integrated circuit chip 80. The integrated circuit chip 80 is electrically connected to the conductive member 40 on the surface of the second substrate 20 opposite to the first substrate 10. In the example shown in FIG. 6, the electrodes (bumps) of the integrated circuit chip 80 are bonded to the conductive member 40, but the electrodes and conductive member 40 may be electrically connected by a conductor such as an interconnect or the like.

On the second substrate 20, on the surface opposite to the first substrate 10, a conductor 82 such as an interconnect (or an interconnect pattern) or the like is formed, and the conductor 82 is electrically connected to the integrated circuit chip 80 (more precisely to the electrodes (bumps) thereof). The conductor 82 may be electrically connected to the interconnect substrate (conductor 60 and substrate 62) described in the first embodiment.

According to this embodiment, an integrated circuit chip 80 can be mounted on the liquid crystal panel. Moreover, since it is not necessary to provide a projection on the second substrate 20 projecting from the first substrate 10, the liquid crystal panel can be constructed to be compact.

Fourth Embodiment

Figure 7:
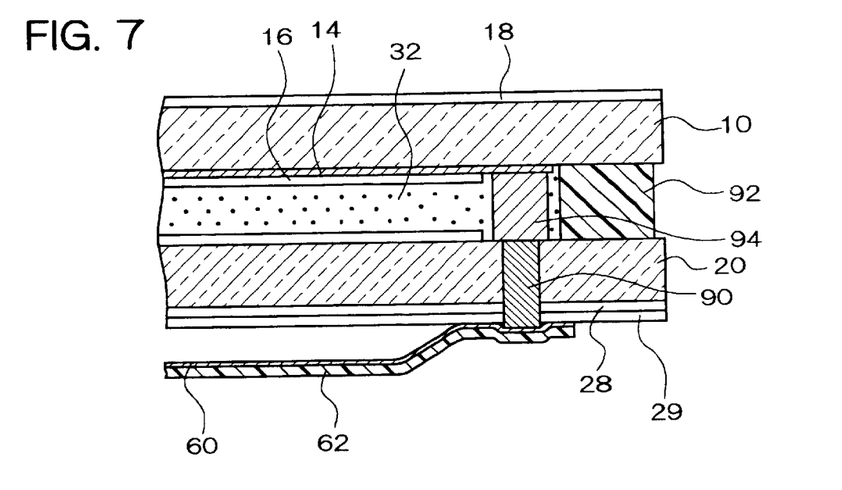
FIG. 7 illustrates a fourth embodiment of a liquid crystal panel to which the present invention is applied.
Figure 8:
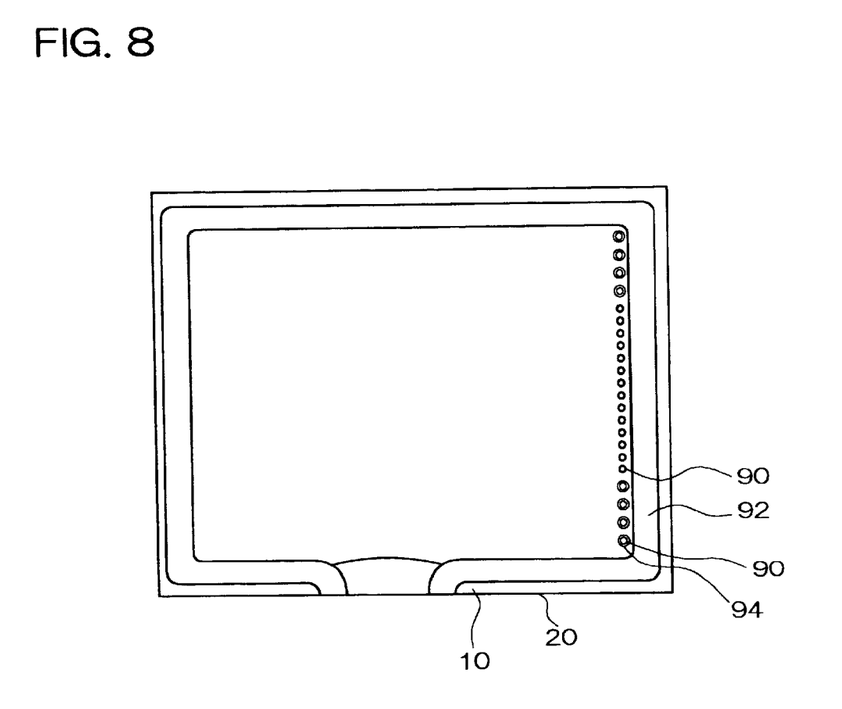
FIG. 8 illustrates the fourth embodiment of a liquid crystal panel to which the present invention is applied.

FIGS. 7 and 8 show a fourth embodiment to which the present invention is applied. This embodiment of a liquid crystal panel comprises the first and second substrates 10 and 20 described in the first embodiment.

In this embodiment, a conductive member 90 passing through the second substrate 20 is formed on the second substrate 20, on the central side (inside) from a sealant 92. The details of the conductive member 40 described in the first embodiment apply to the conductive member 90, except for its position. A vertical conductive member 94 is also formed on the second substrate 20 in the center part from (inside) the sealant 92. The details of the vertical conductive member 94 described in the first embodiment apply to the vertical conductive member 94 except for its position.

According to this embodiment, the interconnects 14 and 24 (see FIGS. 1 to 3) can be formed without passing between the sealant 92 and the first and second substrates 10 and 20. The region of the first and second substrates 10 and 20 outside the sealant 92 can be made smaller. As a result, without reducing the size of the display area, the liquid crystal panel can be made more compact.

Fifth Embodiment

Figure 9:
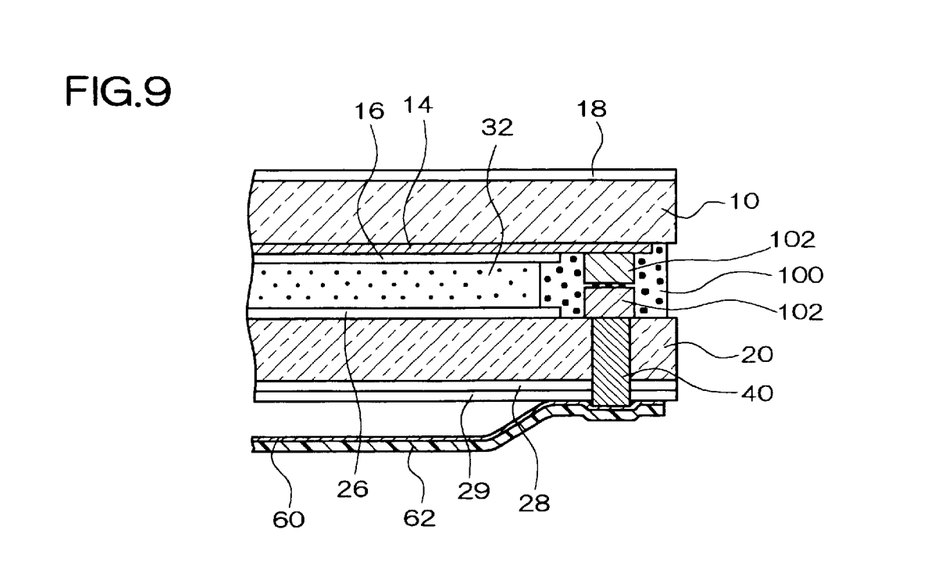
FIG. 9 illustrates a fifth embodiment of a liquid crystal panel to which the present invention is applied.
Figure 10:
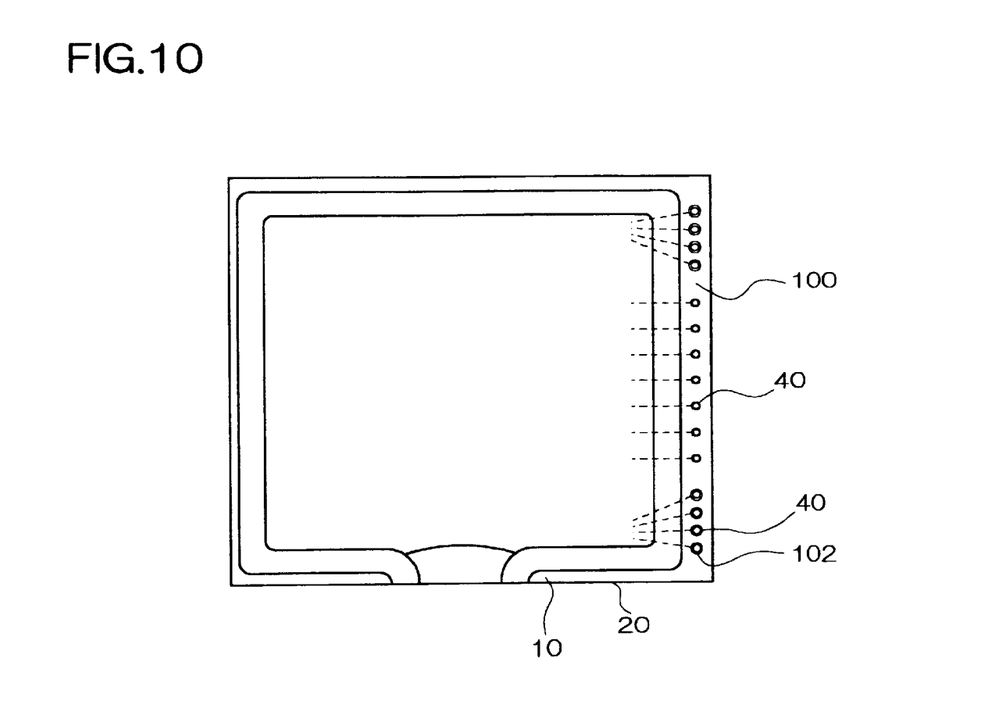
FIG. 10 illustrates the fifth embodiment of a liquid crystal panel to which the present invention is applied.

FIGS. 9 and 10 show a fifth embodiment to which the present invention is applied. This embodiment of a liquid crystal panel comprises the first and second substrates 10 and 20 described in the first embodiment.

In this embodiment, the conductive member 40 passing through the second substrate 20 is formed in a position overlapping with a sealant 100. As the sealant 100 may be used an anisotropic conductive adhesive material such as an anisotropic conductive film (ACF), anisotropic conductive paste (ACP), or the like.

In this case, on at least either of the interconnects 14 and conductive member 40 (both, in the example shown in FIG. 9) are formed bumps 102. It should be noted that the conductive member 40 may be caused to project from the surface of the second substrate 20, and part of the conductive member 40 may form bumps 102. Since the conductive particles of the anisotropic conductive adhesive material are present between the bumps 102, electrical connection between the interconnects 14 and the conductive member 40 can be achieved. In this case, the bumps 102 and conductive particles form a vertical conductive member.

Sixth Embodiment

Figure 11:
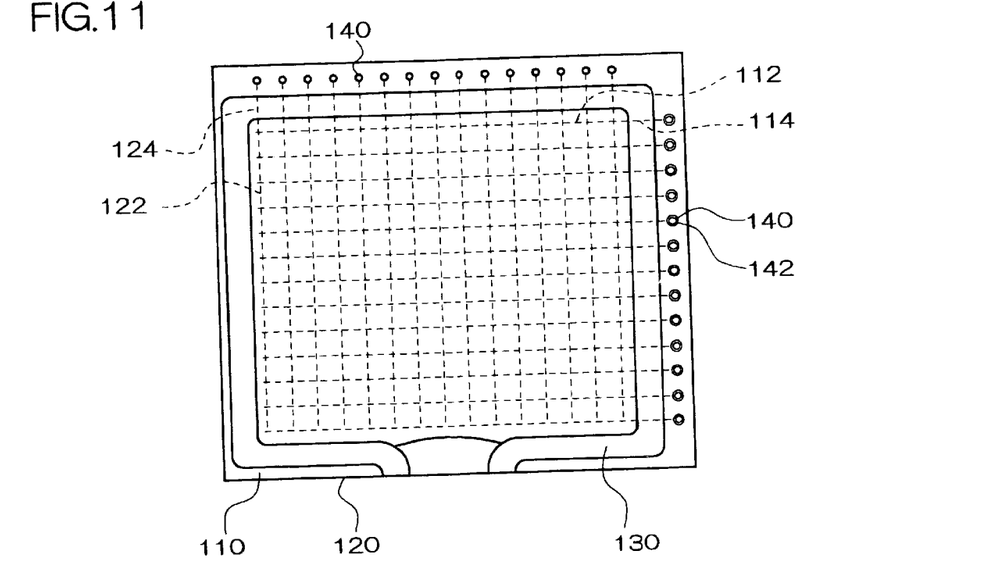
FIG. 11 illustrates a sixth embodiment of a liquid crystal panel to which the present invention is applied.

FIG. 11 shows a sixth embodiment to which the present invention is applied. This embodiment of a liquid crystal panel comprises first and second panels 110 and 120.

On a first substrate 110 is formed a plurality of electrodes 112 and a plurality of interconnects 114. The plurality of electrodes 112 is in a stripe form, and the interconnects 114 are formed in the same direction as the electrodes 112. The interconnects 114 extend to the end of one side of the first substrate 110 which is of rectangular form.

On a second substrate 120 a plurality of electrodes 122 and a plurality of interconnects 124 is formed. The plurality of electrodes 122 is in stripe form, and the interconnects 124 are formed in the-same direction as the electrodes 122. The interconnects 124 extend to the end of one side of the second substrate 120 which is of rectangular form.

The first and second substrates 110 and 120 are disposed so that the electrodes 112 and 122 are in matrix form. The end of the first substrate 110 to which the interconnects 114 are brought out (the right hand side in FIG. 11) and the end of the second substrate 120 to which the interconnects 124 are brought out (the top side in FIG. 11) are positioned as adjacent ends separated by a corner.

Then on the second substrate 120, a plurality of conductive members 140 is provided. The conductive members 140 are the same as the conductive member 40 described in the first embodiment. However, in this embodiment, the conductive members 140 are formed on the ends adjacent ends of the second substrate 120 separated by a corner (the right and top ends in FIG. 11). The conductive members 140 formed on one end (the right hand side in FIG. 11) are electrically connected through a vertical conductive member 142 to the interconnects 114 formed on the first substrate 110. The conductive members 140 formed on another end (the top in FIG. 11) are electrically connected to the interconnects 124 formed on the second substrate 120.

Then on the inside of the conductive members 140, a sealant 130 is provided. This point is the same as in the aspect shown in FIG. 4. In other respects, the content described in the first embodiment applies.

Seventh Embodiment

Figure 12:
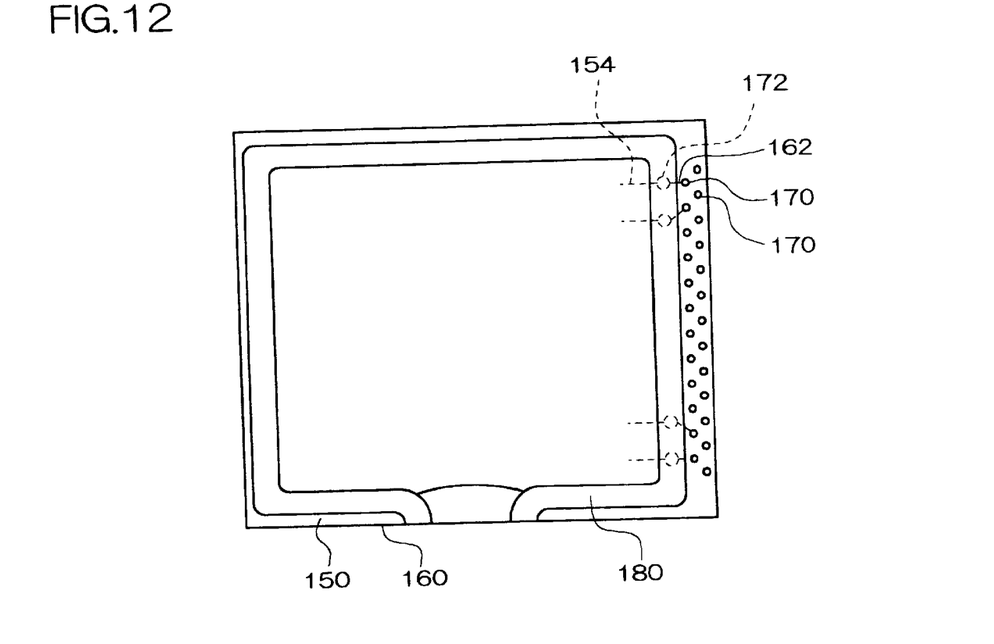
FIG. 12 illustrates a seventh embodiment of a liquid crystal panel to which the present invention is applied.

FIG. 12 shows a seventh embodiment to which the present invention is applied. This embodiment of a liquid crystal panel comprises first and second substrates 150 and 160. On the first substrate 150, electrodes (not shown in the drawings) and interconnects 154 (the same content as the electrodes 12 and interconnects 14 described in the first embodiment applies) are formed. On the second substrate 160, electrodes not shown in the drawings and interconnects (the same content as the electrodes 22 and interconnects 24 described in the first embodiment applies) are formed.

On the second substrate 160, a plurality of conductive members 170 is provided. In this embodiment, the plurality of conductive members 170 is arranged in a plurality of rows. Of the conductive members 170 aligned in a particular row, corresponding to the region between a pair of the conductive members 170, one of an adjacent row of conductive members 170 is aligned. In other words, the plurality of conductive members 170 is arranged in a zigzag. Except for this point, the details of the conductive member 40 described in the first embodiment applies to the conductive members 170.

On the second substrate 160, an interconnect 162 electrically connected to the conductive members 170 is formed. The interconnect 162 is formed on the inside of the second substrate 160 from the conductive members 170. The interconnect 162 is electrically connected to the interconnects 154 formed on the first substrate 150 between the first and second substrates 150 and 160. For this electrical connection, as described in the fifth embodiment, an anisotropic conductive adhesive material may be used as a sealant 180, and bumps 172 may be provided.

In this embodiment, since the conductive members 170 are in zigzag form, the pitch of the conductive members 170 can be made large. Therefore, even for a finely dimensioned panel, a large number of conductive members 170 can easily be formed in a confined space. Since the conductive members 170 can be made large (of large diameter), the conduction resistance can be reduced.

Eighth Embodiment

Figure 13:
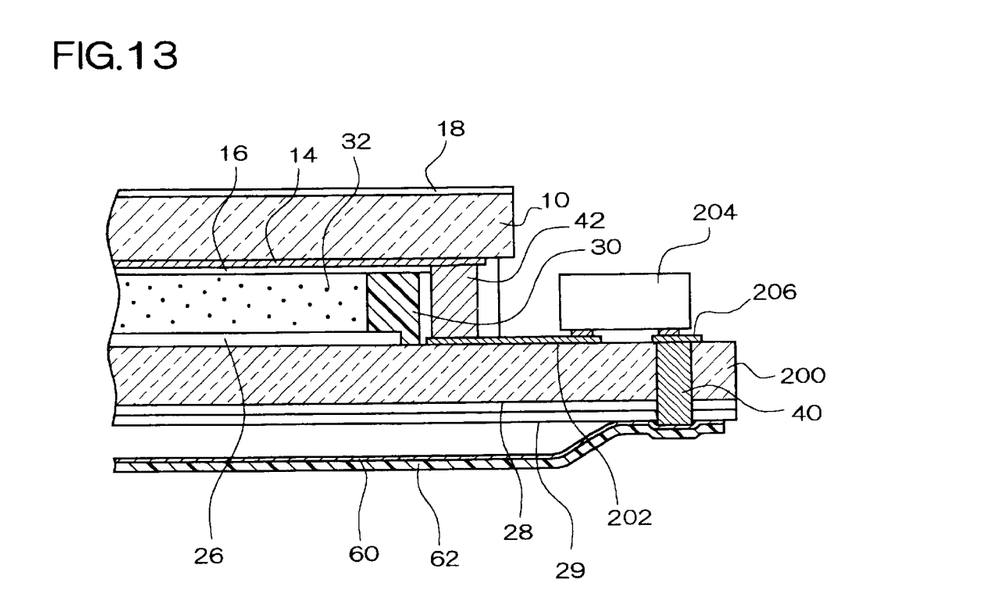
FIG. 13 illustrates an eighth embodiment of a liquid crystal panel to which the present invention is applied.
Figure 14:
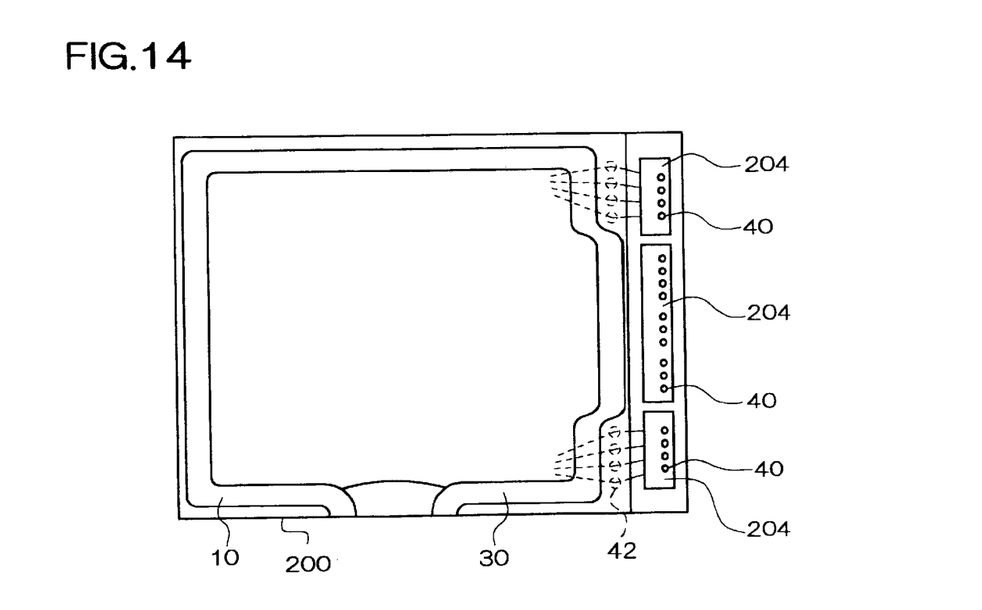
FIG. 14 illustrates the eighth embodiment of a liquid crystal panel to which the present invention is applied.

FIGS. 13 and 14 shown an eighth embodiment to which the present invention is applied. This embodiment of a liquid crystal panel comprises the first substrate 10 described in the first embodiment and a second substrate 200. The end of the second substrate 200 is disposed to project beyond the end of the first substrate 10. The overall form of the second substrate 200 may be larger than the first substrate 10, or first and second substrates 10 and 200 of the same size may be used with a relative displacement.

Between the first and second substrates 10 and 200, a vertical conductive member 42 as described in the first embodiment is provided. On the second substrate 200 an interconnect 202 is formed. The interconnect 202 is electrically connected to the vertical conductive member 42, and is formed to reach as far as the part of the second substrate 200 which projects beyond the first substrate 10. On the part of the second substrate 200 which projects beyond the first substrate 10, an integrated circuit chip 204 (to which the details of the integrated circuit chip 80 shown in FIG. 6 apply) is mounted. The interconnect 202 is electrically connected to the integrated circuit chip 204.

On the part of the second substrate 200 which projects beyond the first substrate 10, the conductive member 40 described in the first embodiment is provided. The conductive member 40 is electrically connected to the interconnects 14 formed on the first substrate 10. In this embodiment, an interconnect 206 formed on the second substrate 200 is electrically connected to the conductive member 40. The interconnect 206 is electrically connected to the integrated circuit chip 204. Therefore, the conductive member 40 is electrically connected through the interconnect 206, integrated circuit chip 204, interconnect 202, and vertical conductive member 42, to the interconnects 14 formed on the first substrate 10.

This embodiment of a liquid crystal panel has a COG (Chip On Glass) construction. The end of the second substrate 200 is provided with a projection, but this projection need only be sufficiently large for the integrated circuit chip 204 to be mounted. Since it is not necessary to bring an interconnect substrate out on the outside of the integrated circuit chip 204, the amount of projection can be greatly reduced compared with a conventional projection.

In place of the integrated circuit chip 204, an integrated circuit such as a driver circuit or the like may be directly created on the surface of the second substrate 200, and formed integrally with the interconnects 202 and 206. In this case, the integrated circuit may be formed immediately under the sealant 30 so as to underlie it. At this time, the conductive member 40 may also be formed in a position directly underneath the sealant 30 to underlie it. In this case, for the integrated circuit chip 204 and the integrated circuit, the number of input and output terminals for is fewer in number than the number of interconnects brought out from the display region. As a result, there is the additional advantage that the number of conductive members (connections) 40 can be reduced, and the manufacturing cost can be reduced.

Ninth Embodiment

Figure 15:
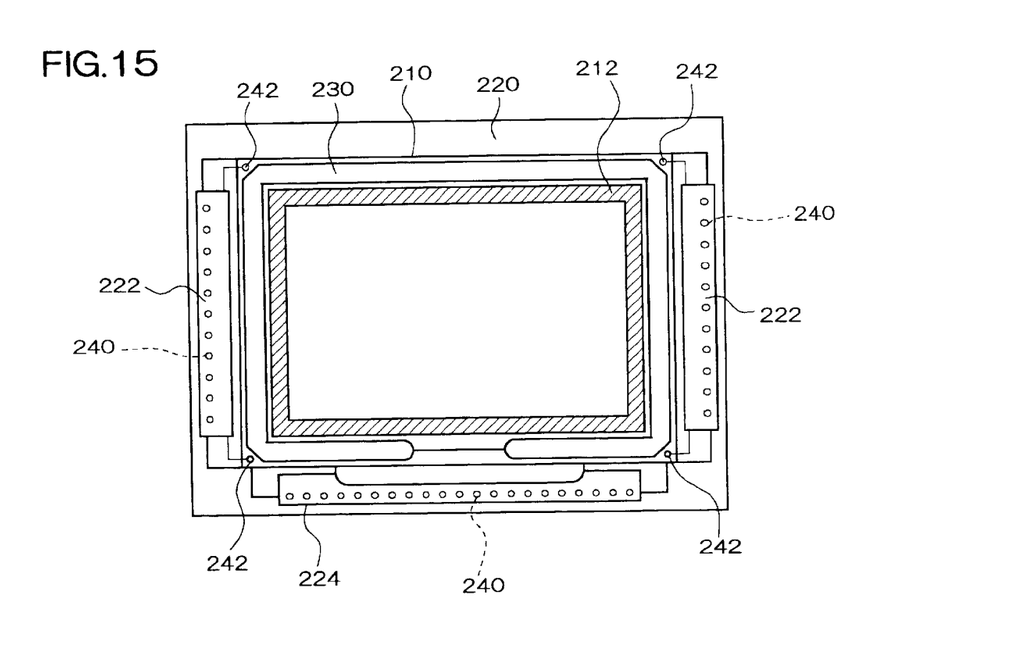
FIG. 15 illustrates a ninth embodiment of a liquid crystal panel to which the present invention is applied.

FIG. 15 shows a ninth embodiment to which the present invention is applied. This embodiment of a liquid crystal panel is an active matrix type liquid crystal panel. That is to say, active elements such as thin film transistors (TFT) are formed for each pixel region arranged in a matrix. A first substrate 210 equipped with electrodes not shown in the drawings and a second substrate 220 on which active elements are formed are disposed opposing each other. The first and second substrates 210 and 220 are adhered together with a sealant 230 interposed, and between them a liquid crystal (not shown in the drawings) is sealed.

On the second substrate 220 are formed the active elements, pixel electrodes which apply a voltage through the active elements, and scan lines and data lines connected to the active elements. The second substrate 220 has a larger area than the first substrate 210, and in the region outside the sealant 230, a scan line drive circuit 222 and data line drive circuit 224 are formed. The scan line drive circuit 222 is electrically connected to the scan lines by interconnects not shown in the drawings, and the data line drive circuit 224 is electrically connected to the data lines by interconnects not shown in the drawings.

On the first substrate 210 are formed a plurality of electrodes (transparent electrodes) and interconnects, not shown in the drawings. The interconnects, are electrically connected to conductive members 240 of the second substrate 220 through vertical conductive members 242 formed for example at the four corners of the first substrate 210. In this embodiment, below the scan line drive circuit 222 and data line drive circuit 224, a plurality of conductive members 240 is provided. The details of the conductive member 40 described in the first embodiment apply to the conductive members 240. The vertical conductive members 242 and conductive members 240 are electrically connected by interconnects.

On the inside of the sealant 230 on the first substrate 210 a light blocking film 212 is formed in the form of a frame. The light blocking film 212 is formed of a black ink constituting a black matrix or a thin film of metal such as chromium or the like, and defines the outer limits of the display region of the liquid crystal panel (the viewing area).

To the formation of the above described active elements, scan line drive circuit 222 and data line drive circuit 224, and the like comprising the integrated circuit is preferable applied technology to form silicon polycrystals in a low temperature process (low temperature polysilicon technology). By means of this, the liquid crystal panel with internal driver circuit can be fabricated at low cost. Since the integrated circuit can be formed below the sealant 230, the liquid crystal panel can be miniaturized.

Tenth Embodiment

Figure 16:
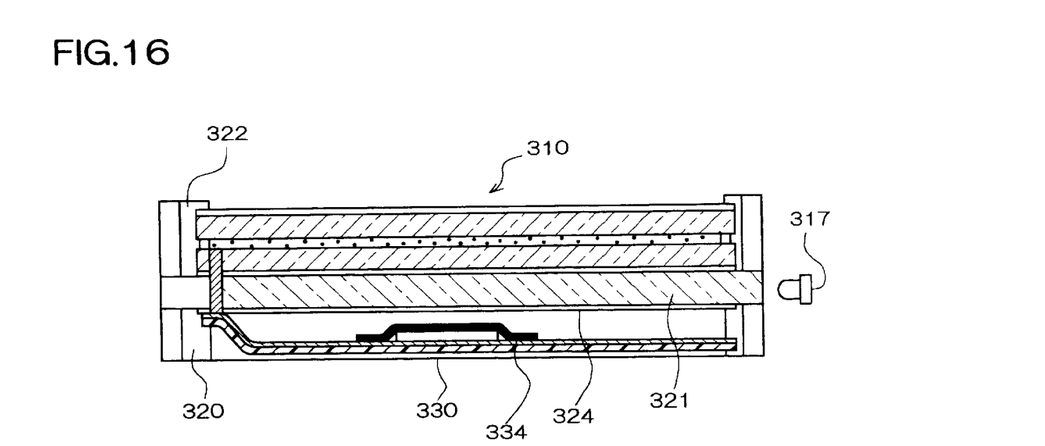
FIG. 16 illustrates a tenth embodiment of a liquid crystal panel to which the present invention is applied.

FIG. 16 shows a tenth embodiment to which the present invention is applied. In this embodiment is described a liquid crystal panel module in which a liquid crystal panel to which the present invention is applied is incorporated. The liquid crystal panel module is mounted on a circuit board installed within an electronic instrument.

The liquid crystal panel module comprises a liquid crystal panel 310 and a panel support 320 formed of synthetic resin on which this is mounted. The panel support 320 can be constituted of a transparent resin such as an acrylic resin or the like, and has a planar light-conductive plate 321, and a frame 322 supporting the end of the light-conductive plate 321. A reflective layer 324 is formed by adhering a white resin film to the rear surface of the light-conductive plate 321.

The liquid crystal panel 310 is that described in the above embodiments. The liquid crystal panel 310 is fixed, for example by being adhered by double-sided adhesive tape or the like to the surface of the light-conductive plate 321. The frame 322 formed on the periphery of the light-conductive plate 321 functions to position the liquid crystal panel 10 and to protect the end of the liquid crystal panel 310.

On a flexible interconnect substrate 330 is mounted an integrated circuit chip 333 such as a driver IC or the like, and the integrated circuit chip 333 is covered by a light blocking film 334.

The panel support 320 is fixed to a circuit board not shown in the drawings within the electronic instrument. A light source 317 such as a light emitting diode or the like commonly mounted on the circuit board is opposed to the side surface of the light-conductive plate 321, and light is conducted from the side surface into the light-conductive plate 321. When light enters the light-conductive plate 321, it is emitted almost uniformly from the surface of the light-conductive plate 321 toward the liquid crystal panel 310. The light is passed through the liquid crystal panel 310, allowing optical control (for example a particular display).

Other Embodiments

Figure 17:
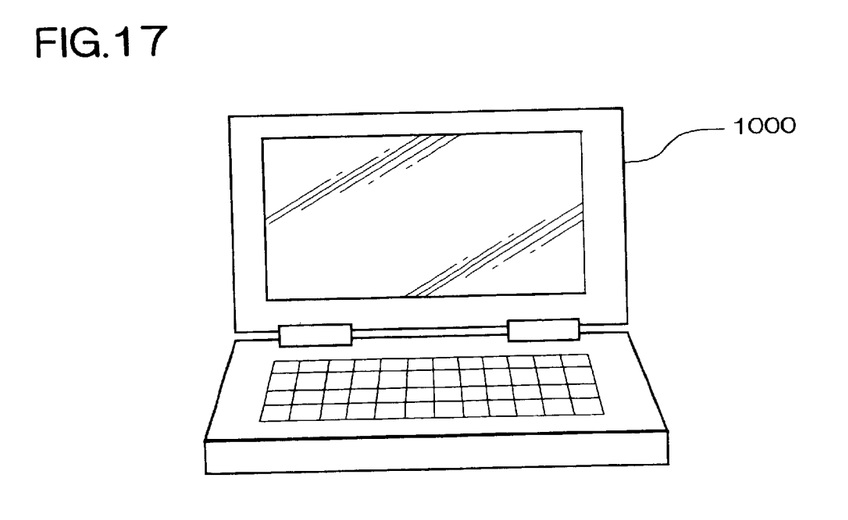
FIG. 17 shows an electronic instrument having an electro-optical device to which the present invention is applied.
Figure 18:
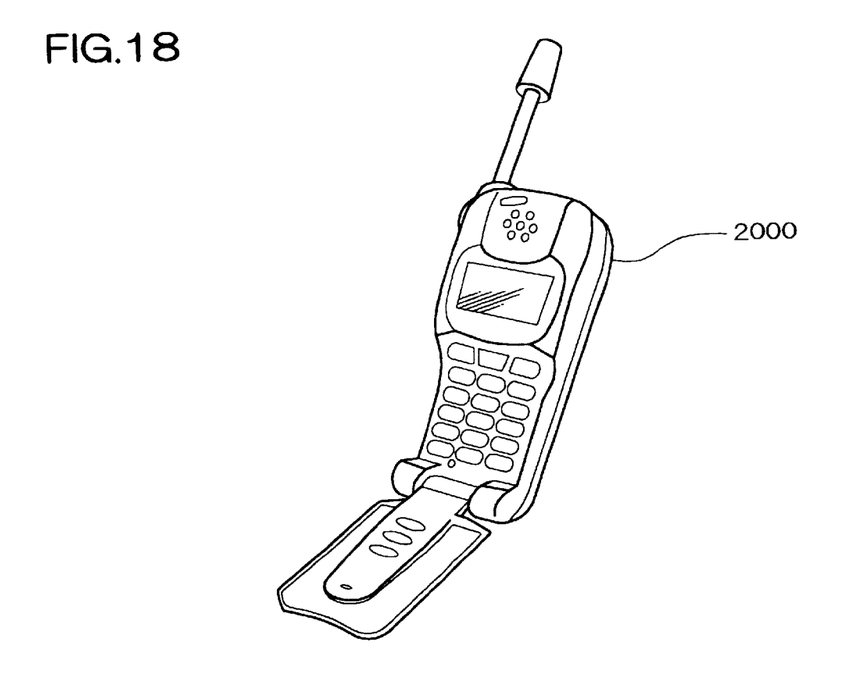
FIG. 18 shows an electronic instrument having an electro-optical device to which the present invention is applied.

The electro-optical device (for example a liquid crystal panel) to which the present invention is applied can be used in a variety of electronic instruments, such as the personal computer 1000 shown in FIG. 17, the portable telephone shown in FIG. 18, a portable data display terminal, a clock, and the like. In particular, by using the above described liquid crystal panel in a portable device, the display can be made more compact, and therefore the instrument as a whole can be made more compact.

Figure 19:
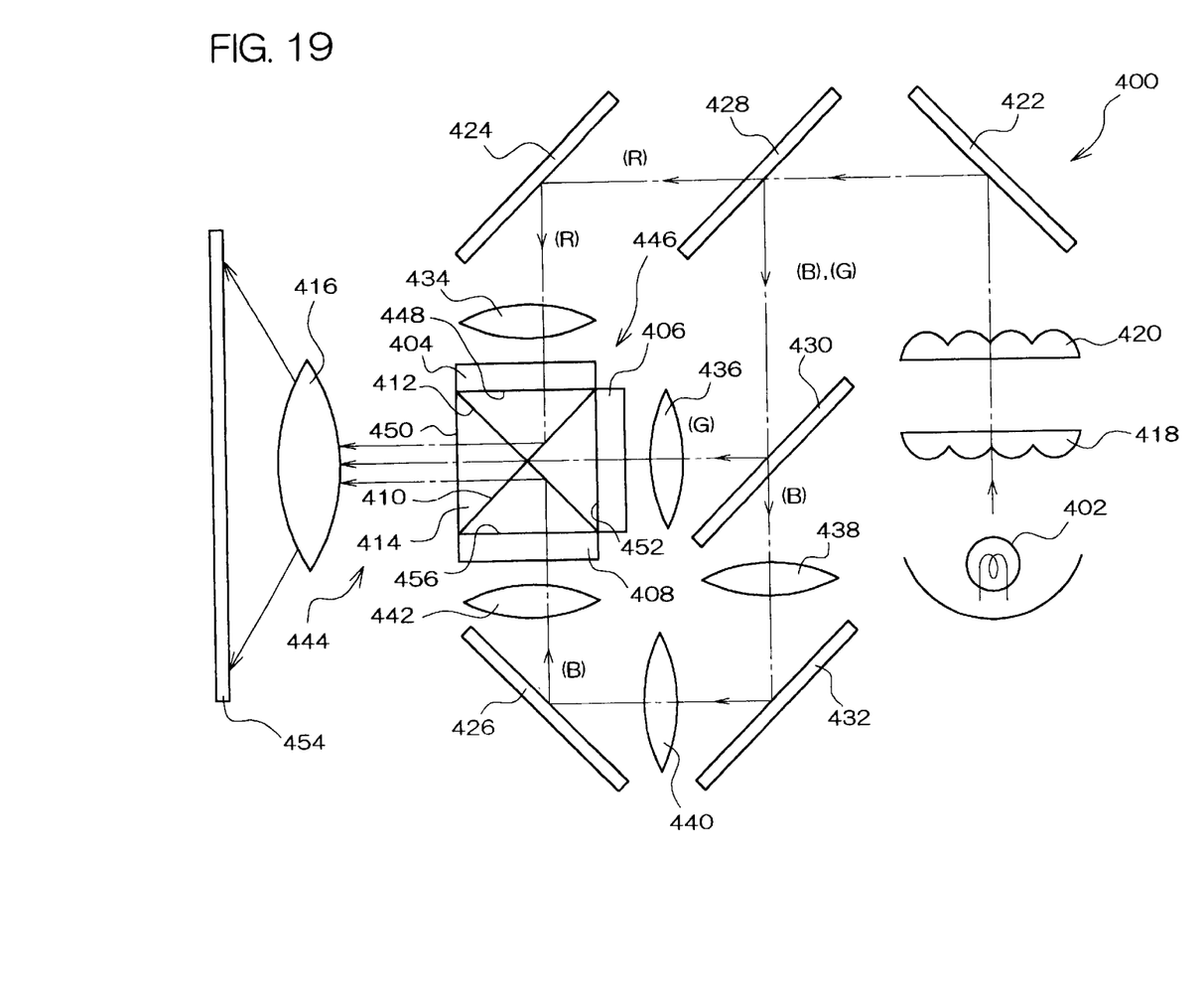
FIG. 19 shows an electronic instrument having an electro-optical device to which the present invention is applied.

Next a projection type display device (liquid crystal projector) using a liquid crystal panel to which the present invention is applied is described. FIG. 19 schematically illustrates the optical system of the projection type display device of this embodiment.

A projection type display device 400 comprises an illumination optical system equipped with a light source 402 and a plurality of integrator lenses, a color separation optical system (light supply optical system) equipped with a plurality of dichroic mirrors and the like, a liquid crystal light valve (liquid crystal optical shutter array) 404 corresponding to red color (for red color), a liquid crystal light valve (liquid crystal optical shutter array) 406 corresponding to green color (for green color), a liquid crystal light valve (liquid crystal optical shutter array) 408 corresponding to blue color (for blue color), a dichroic prism (color combining optical system) 414 having formed a dichroic mirror surface 410 reflecting only red light and a dichroic mirror surface 412 reflecting only blue light, and a projection lens (projection optical system) 416.

The illumination optical system comprises integrator lenses 418 and 420. The color separation optical system comprises mirrors 422, 424, and 426, a dichroic mirror 428 which reflects blue light and green light (allows only red light to pass), a dichroic mirror 430 which reflects green light only, a dichroic mirror 432 which reflects only blue light (or a mirror which reflects blue light), and condenser lenses 434, 436, 438, 440, and 442.

The liquid crystal light valve 406 includes the liquid crystal panel to which the present invention is applied. To the entry surface of the liquid crystal panel (the surface on which a microlens substrate is positioned, in other words the opposite side to the dichroic prism 21) a first polarizer (not shown in the drawings) is bonded, and to the emission surface of the liquid crystal panel (the surface opposing the microlens substrate, that is to say, the side of the dichroic prism 21) a second polarizer (not shown in the drawings) is bonded. The liquid crystal light valves 404 and 408 are also constructed in the same way as the liquid crystal light valve 406. The liquid crystal panel equipped with these liquid crystal light valves 404, 406, and 408 is connected to respective drive circuits not shown in the drawings.

With the projection type display device 400, the dichroic prism 414 and projection lens 416 constitute an optical system 444. This optical system 444 and the liquid crystal light valves 404, 406, and 408 installed in fixed positions with respect to the dichroic prism 414 constitute a display unit 446.

Next the operation of the projection type display device 400 is described.

White light (a white light beam) emitted by the light source 402 passes through the integrator lenses 418 and 420. The strength (intensity distribution) of this white light is rendered uniform by the integrator lenses 418 and 420.

The white light that has passed through the integrator lenses 418 and 420 is reflected by the mirror 422, and of the reflected light the blue light (B) and green light (G) are each reflected by the dichroic mirror 428, while the red light (R) passes through the dichroic mirror 428.

The red light which has passed through the dichroic mirror 428 is reflected by the mirror 424, and this reflected light is collimated by the condenser lens 434, and then impinges on the red color liquid crystal light valve 404.

Of the blue light and green light reflected by the dichroic mirror 428, the green light is reflected by the dichroic mirror 430, and the blue light passes through the dichroic mirror 430.

The green light reflected by the dichroic mirror 430 is collimated by the condenser lens 436, and then impinges on the green color liquid crystal light valve 406.

The blue light which has passed through the dichroic mirror 430 is reflected by the dichroic mirror (or mirror) 432, and this reflected light is reflected by the mirror 426. The blue light is collimated by the condenser lenses 438, 440, and 442, and then impinges on the blue color liquid crystal light valve 408.

In this way, the white light emitted by the light source 402 undergoes color separation into the three primary colors red, green, and blue by the color separation optical system, and is supplied to and impinges on the corresponding liquid crystal light valves.

At this point the pixels of the liquid crystal panel of the liquid crystal light valve 404 (the thin film transistors and the pixel electrodes connected thereto) are subjected to switching (on/off) control by a drive circuit (drive means) operating based on an image signal for red, that is to say, are modulated.

Similarly, the green light and blue light impinges on respective liquid crystal light valves 406 and 408, and is modulated by the respective liquid crystal panels, thus forming a green image and a blue image. At this point the pixels of the liquid crystal panel of the liquid crystal light valve 406 are subjected to switching control by a drive circuit operating based on an image signal for green, and the pixels of the liquid crystal panel of the liquid crystal light valve 408 are subjected to switching control by a drive circuit operating based on an image signal for blue.

In this way the red light, green light, and blue light is modulated by the respective liquid crystal light valves 404, 406, and 408 to create respectively a red image, green image and blue image.

The red image formed by the liquid crystal light valve 404, that is to say, the red light from the liquid crystal light valve 404, enters the dichroic prism 414 from the surface 448, is reflected by the dichroic mirror surface 410, passes through the dichroic mirror surface 412, and is emitted from the emission surface 450.

The green image formed by the liquid crystal light valve 406, that is to say, the green light from the liquid crystal light valve 406, enters the dichroic prism 414 from the surface 452, passes through the dichroic mirror surfaces 410 and 412, and is emitted from the emission surface 450.

The blue image formed by the liquid crystal light valve 408, that is to say, the blue light from the liquid crystal light valve 408, enters the dichroic prism 414 from the surface 456, is reflected by the dichroic mirror surface 412, passes through the dichroic mirror surface 410, and is emitted from the emission surface 450.

In this way, the light of different colors from the liquid crystal light valves 404, 406, and 408, that is to say, the images formed by the liquid crystal light valves 404, 406, and 408, are combined by the dichroic prism 414, and in this way a full-color image is formed. This image is projected (enlarged projection) on a screen 454 installed in a suitable position, by means of a projection lens 416.

What is claimed is:

1. An electro-optical device comprising:

first and second substrates disposed to oppose each other;

an interconnect formed on a surface of the first substrate opposing the second substrate;

a conductive member provided to pass through the second substrate;

a conductor disposed on an opposite side of the second substrate from the first substrate, the conductor electrically connected to the conductive member, the conductor extending to overlap with the interconnect; and a vertical conductive member provided between the interconnect and the conductive member, the vertical conductive member provided on the conductive member, wherein the conductive member and the interconnect are electrically connected between the first and second substrates.

2. The electro-optical device as defined in claim 1, further comprising an integrated circuit chip disposed on an opposite side of the second substrate from the first substrate, wherein the conductor is electrically connected to the integrated circuit chip.

3. The electro-optical device as defined in claim 1, wherein a plurality of the interconnects are formed, and wherein a plurality of the conductive members electrically connected to the plurality of interconnects are provided.

4. The electro-optical device as defined in claim 3, wherein the plurality of conductive members are arranged in a zigzag.

5. The electro-optical device as defined in claim 1, wherein the conductive member is formed on a part of the second substrate which overlaps with the first substrate.

6. The electro-optical device as defined in claim 1, wherein the first and second substrates are adhered together by a sealant, and wherein the conductive member is formed on a portion of the second substrate which overlaps with the sealant.

7. The electro-optical device as defined in claim 6, wherein the sealant is an anisotropic conductive adhesive material.

8. An electronic instrument comprising the electro-optical device as defined in claim 1.

9. An electro-optical device comprising:

first and second substrates disposed to oppose each other, the second substrate having a penetrating hole formed therein;

an interconnect formed on the surface of the first substrate opposing the second substrate;

a conductive member provided in the penetrating hole; and a vertical conductive member provided between the interconnect and the conductive member, the vertical conductive member provided on the conductive member, wherein the conductive member and the interconnect are electrically connected between the first and second substrates, wherein the first and second substrates are adhered together by a sealant, and wherein the conductive member is formed closer to an end of the second substrate than the sealant.

10. An electronic instrument comprising the electro-optical device as defined in claim 9.

11. An electro-optical device comprising:

first and second substrates disposed to oppose each other;

an interconnect formed on a surface of the first substrate opposing the second substrate;

a conductive member provided to pass through the second substrate; and a vertical conductive member provided between the interconnect and the conductive member, the vertical conductive member provided on the conductive member, wherein the conductive member and the interconnect are electrically connected between the first and second substrates, wherein the first and second substrates are adhered together by a sealant, and wherein the conductive member is formed closer to a center of the substrate than the sealant.

12. An electronic instrument comprising the electro-optical device as defined in claim 11.

* * * * *